US008665554B2

(12) United States Patent  
Manes et al.

(10) Patent No.: US 8,665,554 B2  
(45) Date of Patent: Mar. 4, 2014

(54) RATCHETING GRIPPER FOR A STORAGE LIBRARY

(75) Inventors: Joseph Paul Manes, Arvada, CO (US); David Christopher Black, Broomfield, CO (US)

(73) Assignee: Oracle International Corporation, Redwood City, CA (US)

( * ) Notice: Subject to any disclaimer, the term of this patent is extended or adjusted under 35 U.S.C. 154(b) by 185 days.

(21) Appl. No.: 13/348,486

(22) Filed: Jan. 11, 2012

(65) Prior Publication Data

US 2013/0177371 A1   Jul. 11, 2013

(51) Int. Cl.  
*G11B 15/68* (2006.01)

(52) U.S. Cl.  
USPC ......................................................... 360/92.1

(58) Field of Classification Search  
CPC ........................... G11B 15/6835; G11B 17/225  
USPC ................. 360/92.1; 369/30.39, 30.43, 30.45  
See application file for complete search history.

(56) References Cited

U.S. PATENT DOCUMENTS

| | | | | |
|---|---|---|---|---|
| 5,487,579 | A * | 1/1996 | Woodruff | 294/115 |
| 6,262,862 | B1 * | 7/2001 | Kato et al. | 360/92.1 |
| 6,445,651 | B1 * | 9/2002 | Felde et al. | 369/30.41 |
| 6,669,431 | B1 * | 12/2003 | Falace et al. | 414/280 |
| 6,771,457 | B2 * | 8/2004 | Flaherty et al. | 360/92.1 |
| 6,943,982 | B2 * | 9/2005 | Flaherty et al. | 360/92.1 |
| 7,184,242 | B1 * | 2/2007 | Ostwald et al. | 360/92.1 |
| 7,193,810 | B2 * | 3/2007 | Dickey et al. | 360/92.1 |
| 7,212,375 | B2 * | 5/2007 | Dickey et al. | 360/96.4 |
| 7,230,791 | B1 * | 6/2007 | Ostwald et al. | 360/92.1 |
| 7,466,511 | B2 * | 12/2008 | Ishiyama | 360/92.1 |
| 7,707,596 | B1 * | 4/2010 | Grow | 720/620 |
| 8,134,799 | B1 * | 3/2012 | Ostwald et al. | 360/92.1 |

* cited by examiner

*Primary Examiner* — Angel Castro  
(74) *Attorney, Agent, or Firm* — Marsh Fischmann & Breyfogle LLP; Daniel J. Sherwinter

(57) ABSTRACT

Embodiments of the invention include systems and methods for selective gripping and/or releasing of media cartridges using a robotic ratcheting gripper mechanism. Embodiments operate in context of a data storage library having a number of media cartridges physically located within slots of one or more magazines. A robot with a hand assembly uses a gripper mechanism to retrieve and ferry the cartridges between the magazines and one or more media drives. A novel gripper mechanism is provided that toggles between open and closed states according to movement of the gripper. In some embodiments, movement of a carriage from a retracted to an extended position extends the gripper mechanism and toggles its state, while movement of the carriage from the extended to the retracted position retracts the gripper mechanism while maintaining its state. Certain embodiments implement this functionality with simple mechanical components.

14 Claims, 12 Drawing Sheets

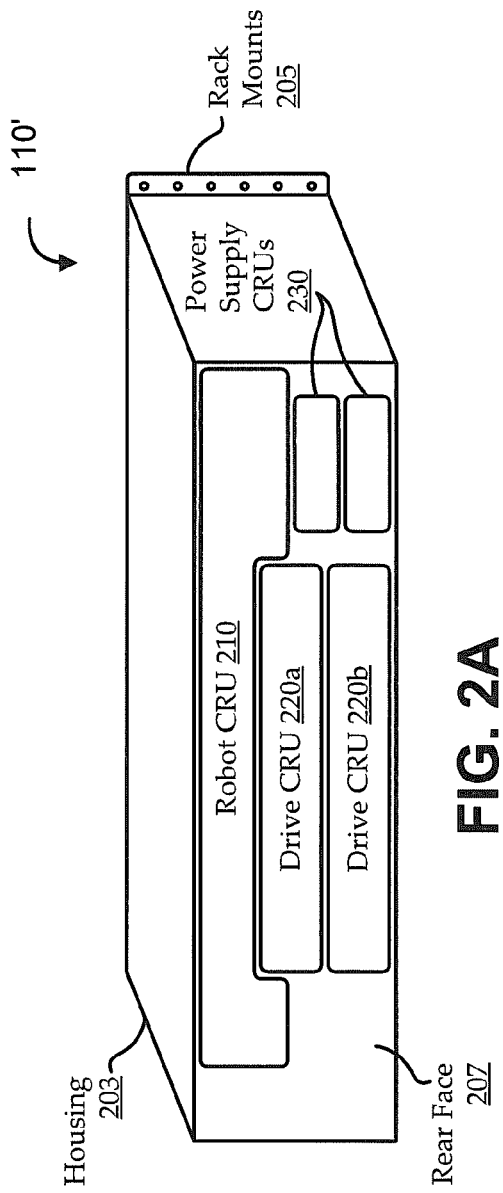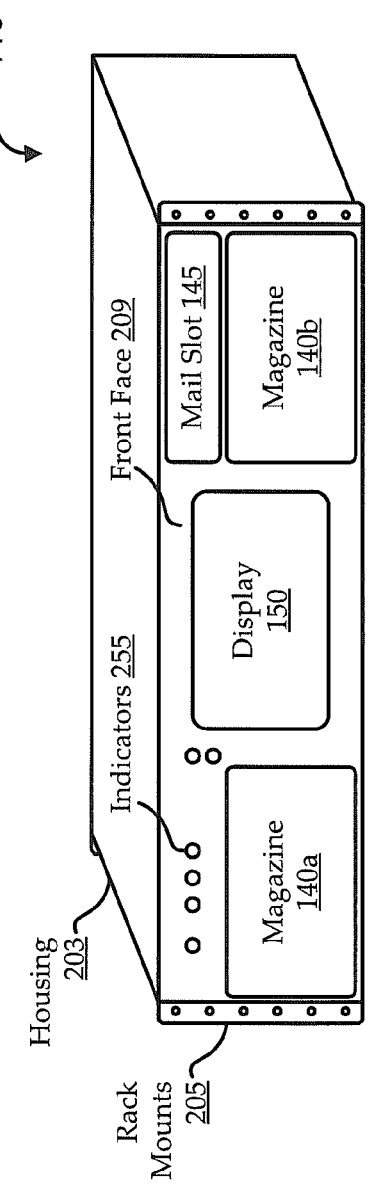

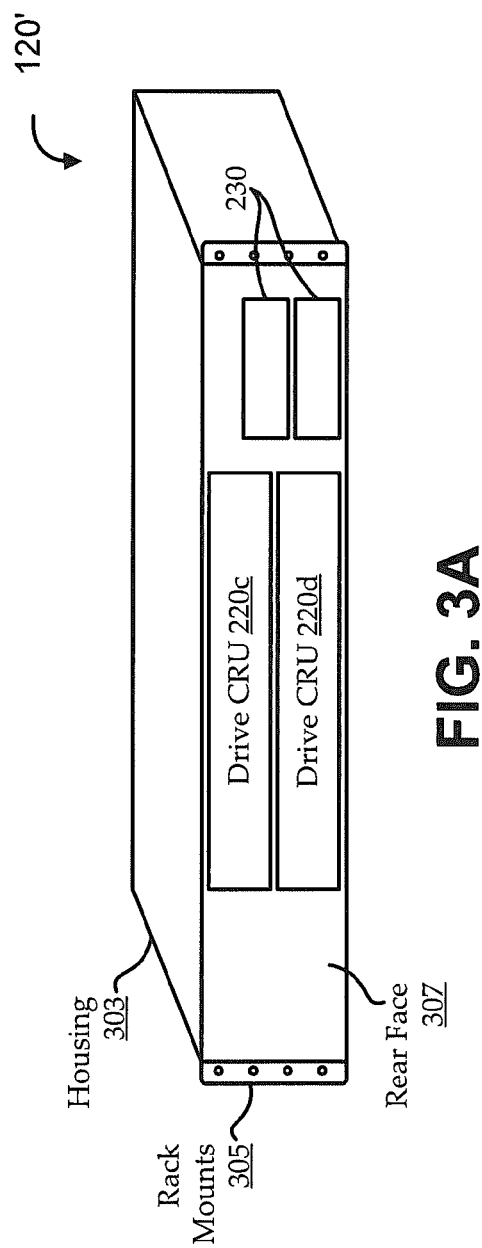
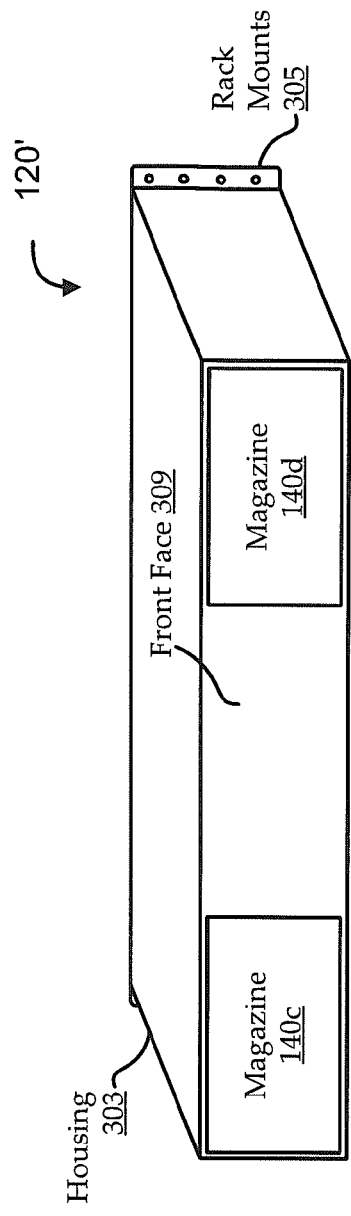
FIG. 3A
FIG. 3B

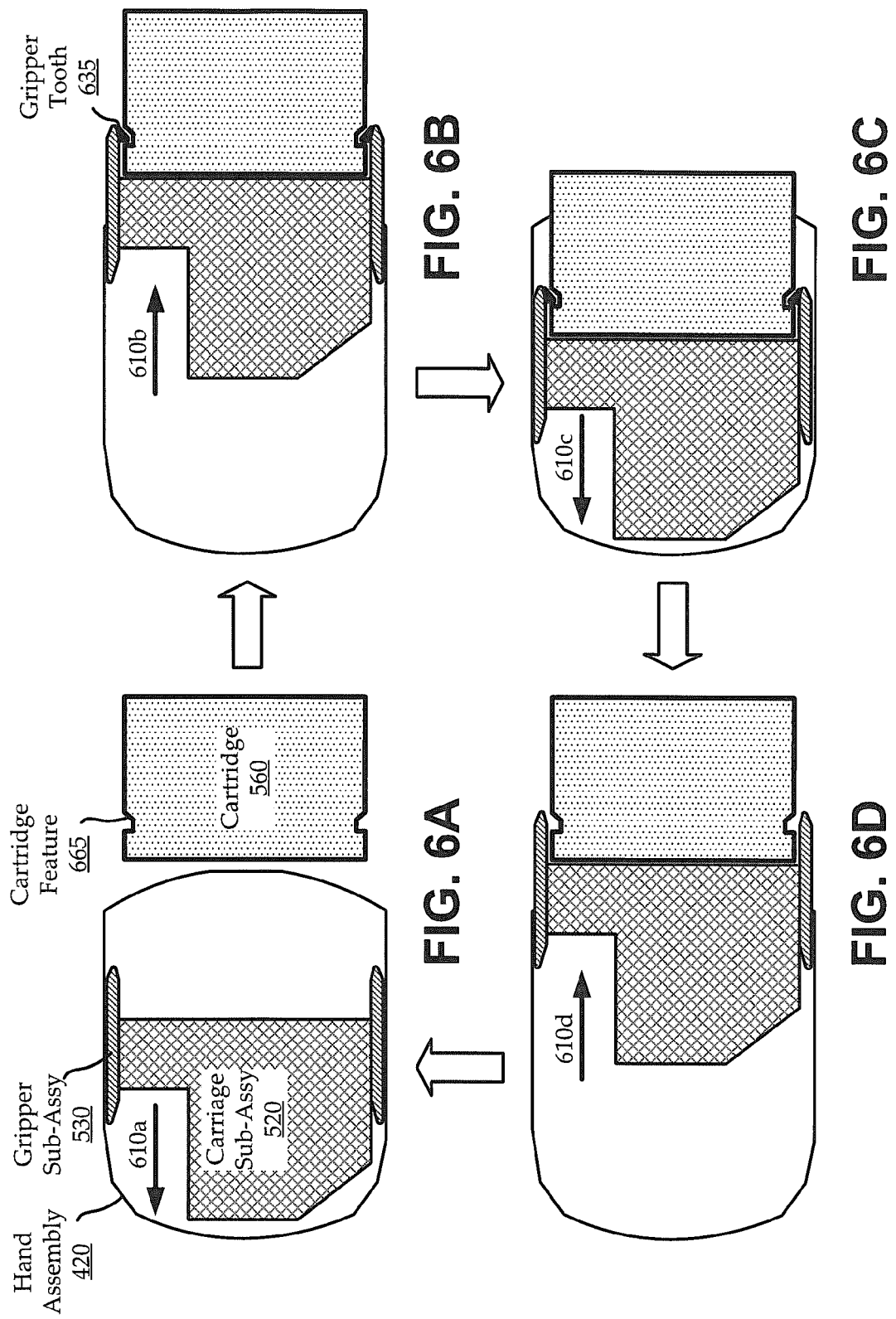

RATCHETING GRIPPER FOR A STORAGE LIBRARY

FIELD

Embodiments relate generally to data storage systems, and, more particularly, to gripper mechanisms for use in storage libraries.

BACKGROUND

Storage library systems are often used by enterprises and the like to efficiently store and retrieve data from storage media. In the case of some storage libraries, the media are data cartridges (e.g., tape cartridges) that are typically stored and indexed within a set of magazines. When particular data is requested, a specialized robotic mechanism finds the appropriate cartridge, removes the cartridge from its magazine, and carries the cartridge to a drive that is designed to receive the cartridge and read its contents. Some storage libraries have multiple drives that can operate concurrently to perform input/output (IO) operations on multiple cartridges.

To operate properly, the robotic mechanisms are expected to reliably (e.g., repeatably and accurately) and rapidly find, retrieve, and deliver desired cartridges throughout the storage library cartridge inventory. This functionality can be facilitated by configuring the robotic mechanism to move a hand assembly in at least three axes (e.g., x, y, and z directions, and sometimes one or more of pitch, roll, or yaw), and to include one or more sensors to reliably detect the position and/or orientation of the hand assembly. When in its desired location, the hand assembly is activated to reliably grip the desired cartridge and remove it from a magazine or drive, or to reliably release the cartridge into a desired magazine slot or drive. The gripping and/or releasing of the cartridge is typically performed by a gripper that is part of the hand assembly.

Many traditional implementations of the gripper include complex, expensive, and/or heavy components. For example, some designs use solenoid-operated opposing gripper plates acting against a spring load. While these and other techniques can be reliable, they tend to manifest undesirable power consumption characteristics and to include heavy and/or expensive components (e.g., solenoids, power cables, specialized hardware and software, etc.).

BRIEF SUMMARY

Among other things, systems and methods are described for providing selective gripping and/or releasing of media cartridges using a robotic ratcheting gripper mechanism. Embodiments operate in context of a data storage library having a number of media cartridges physically located within slots of one or more magazines. A robot with a hand assembly uses a gripper mechanism to retrieve and ferry the cartridges between the magazines and one or more media drives. A novel gripper mechanism is provided that toggles between open and closed states according to movement of the gripper. In some embodiments, movement of a carriage from a retracted to an extended position extends the gripper mechanism and toggles its state, while movement of the carriage from the extended to the retracted position retracts the gripper mechanism while maintaining its state. Certain embodiments implement this functionality with simple mechanical components.

According to one set of embodiments, a hand assembly is provided for physically handling media in a data storage library. The hand assembly includes: a carriage subassembly configured to move along a path between a first position and a second position and in mechanical communication with a gripper subassembly that is configured to be in an open state or a closed state; a ratchet subassembly configured to be triggered by motion of the carriage subassembly from the first position to the second position and not to be triggered by motion of the carriage subassembly from the second position to the first position; and a toggler subassembly in mechanical communication with the ratchet subassembly and the gripper subassembly in such a way that triggering the ratchet subassembly causes the toggler subassembly to toggle the gripper subassembly between the open state and the closed state.

According to one such embodiment, when the gripper subassembly is in the open state and the carriage subassembly is in the retracted position, movement of the carriage subassembly along the path to the extended position triggers the gripper subassembly to toggle to the closed state; when the gripper subassembly is in the open state and the carriage subassembly is in the extended position, movement of the carriage subassembly along the path to the retracted position maintains the gripper subassembly in the open state; when the gripper subassembly is in the closed state and the carriage subassembly is in the retracted position, movement of the carriage subassembly along the path to the extended position triggers the gripper subassembly to toggle to the open state; and when the gripper subassembly is in the closed state and the carriage subassembly is in the extended position, movement of the carriage subassembly along the path to the retracted position maintains the gripper subassembly in the closed state.

According to another set of embodiments, another hand assembly is provided. The hand assembly includes: driving means for moving a gripping means along a path between a first position and a second position; and toggling means for toggling the gripping means between an open state and a closed state in response to triggering by a triggering means, the triggering means being triggered by motion of the gripping means from the first position to the second position and not by motion of the gripping means from the second position to the first position.

According to yet another set of embodiments, a method is provided. The method includes: driving a carriage to move along a path from a first position to a second position, the carriage being in mechanical communication with a gripper configured to be in an open state or a closed state; triggering a ratcheter using the motion of the carriage, the ratcheter coupled with a toggler in such a way that the triggering causes the toggler to toggle the gripper from the open state to the closed state; and returning the carriage from the second position to the first position in such a way that does not trigger the ratcheter and maintains the gripper in the closed state. For example, driving the carriage to move along the path from the first position to the second position includes driving the carriage from a retracted position to an extended position to place gripping features of the gripper in proximity to a gripping location on a media cartridge; triggering the ratcheter includes causing the toggler to toggle the gripper from the open state to the closed state so that the gripping features of the gripper grip the gripping location on the media cartridge; and returning the carriage from the second position to the first position in such a way that does not trigger the ratcheter and maintains the gripper in the closed state includes drawing the media cartridge into the retracted position of the carriage.

BRIEF DESCRIPTION OF THE DRAWINGS

The present disclosure is described in conjunction with the appended figures:

FIGS. 2A and 2B show rear and front views, respectively, of an illustrative base module, according to various embodiments;

FIGS. 3A and 3B show rear and front views, respectively, of an illustrative expansion module, according to various embodiments;

FIGS. 6A-6D show four states of a simplified hand assembly, like the one described in FIG. 5, according to various embodiments;

In the appended figures, similar components and/or features may have the same reference label. Further, various components of the same type may be distinguished by following the reference label by a second label that distinguishes among the similar components. If only the first reference label is used in the specification, the description is applicable to any one of the similar components having the same first reference label irrespective of the second reference label.

DETAILED DESCRIPTION

In the following description, numerous specific details are set forth to provide a thorough understanding of the present invention. However, one having ordinary skill in the art should recognize that the invention may be practiced without these specific details. In some instances, circuits, structures, and techniques have not been shown in detail to avoid obscuring the present invention.

Figure 1:
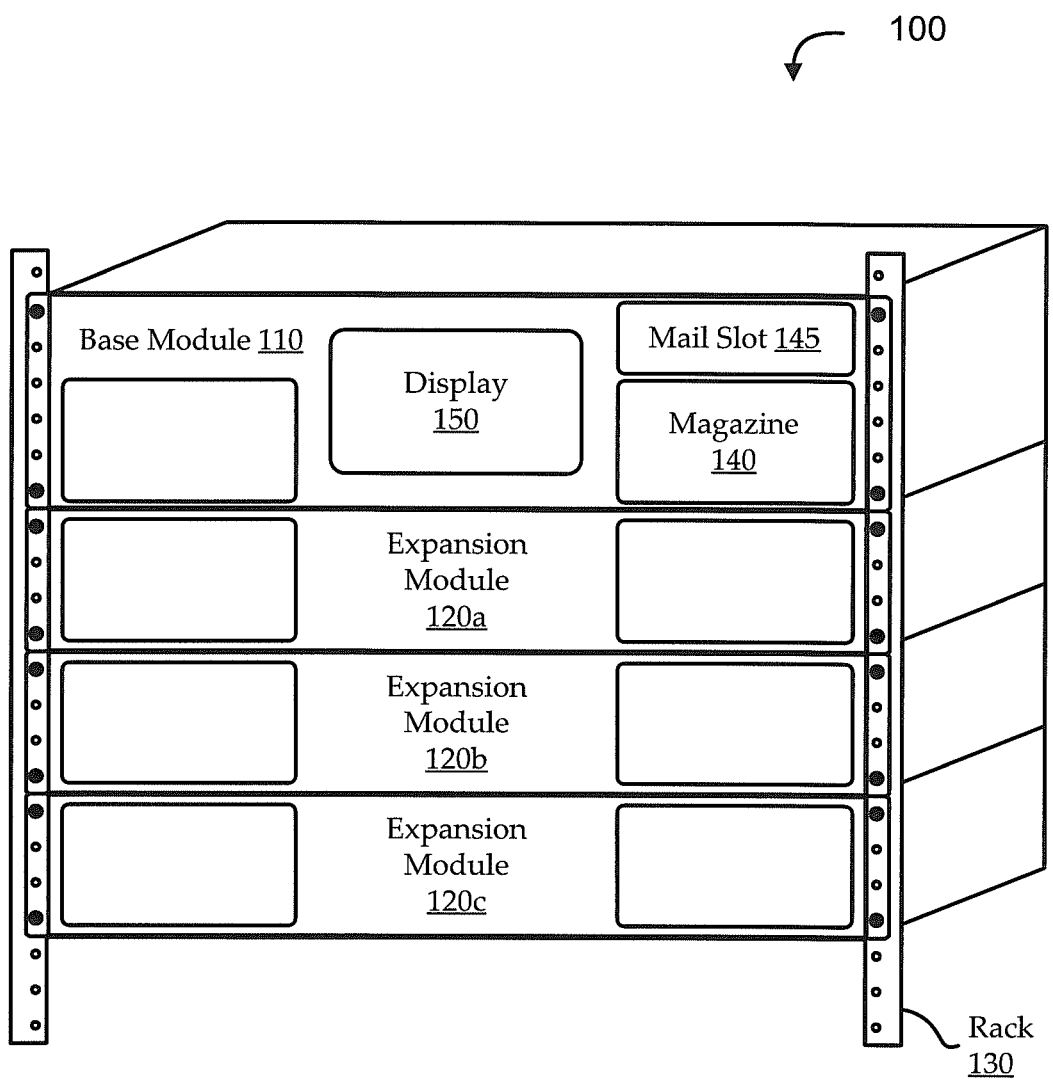
FIG. 1 shows a block diagram of an illustrative rack-mounted storage library, to provide a context for various embodiments.

For the sake of context, FIG. 1 shows a rack-mounted storage library 100 for use with various embodiments. The storage library 100 includes a base module 110 and one or more expansion modules 120, configured to be mounted in an equipment rack 130 (only the mounting rails of the equipment rack 130 are shown for simplicity). The base module 110 and expansion modules 120 provide physical storage for multiple storage media cartridges (e.g., tape cartridges) in magazines 140. Embodiments also include one or more media drives (e.g., tape drives), controllers, power supplies, indicators, communications subsystems, and/or other functions. As will be discussed more fully below, the storage library 100 also includes a robotic mechanism for finding and ferrying storage media cartridges between locations within the storage library 100 (e.g., magazines 140 and drives).

According to an illustrative embodiment, the storage library 100 is a small, rack-mounted, automated tape library. The base module 110 is "3 RU" high (three standard rack units, or approximately 5.25-inch high) and includes one robotic mechanism. Up to nine additional, "2 RU" high (approximately 3.5-inch high) expansion modules 120 can be added to provide additional drive and/or magazine 140 slot capacity, so that a maximum configuration of one base module 110 and nine expansion modules 120 has a total height of "21 RU," or half of a standard equipment rack 130. The single robot mechanism is configured to access all magazine 140 slots and drives in the base module 110 and all expansion modules 120.

In the illustrative embodiment, each of the base module 110 and the expansion modules 120 can house up to two half-height or one full-height LTO5 tape drives. Each of the base module 110 and the expansion modules 120 can also house two removable magazines 140, each having fifteen cartridge slots. In some implementations, the storage library 100 can be divided into partitions each associated with, for example, at least one drive and at least one magazine 140. Each partition can be configured to behave as an independent library, notwithstanding that all partitions share the single robotic mechanism (e.g., partitions can be commanded as independent libraries for tape operations, while sharing many resources for service and administration). Some implementations also include a "mailslot" 145 in the base module 110, as discussed below.

Some embodiments provide local and remote management of various functions through graphical user interfaces (GUI). In one implementation, the local interface GUI is displayed on a seven-inch, front-mounted, touch-screen panel display 150. The remote interface may be implemented as a browser-based interface (BUI), accessible by connecting a web browser to the library's Internet protocol (IP) address.

Some embodiments are configured to be installable and serviceable by end customers to the greatest extent practical. For example, an installation wizard may be provided to simplify initial installation, a simple rack rail system for base modules 110 and expansion modules 120 will allow two people without any mechanical assistance (e.g. lift) to easily install the modules on an equipment rack 130. In some such embodiments, most replaceable library components will be Customer Replaceable Units (CRUs) (i.e., as opposed to field replaceable units (FRUs), which are serviceable and/or replaceable only by trained technicians). For example, certain implementations allow almost all installation, maintenance, upgrades, and/or normal use of the storage library 100 to be performed with only front and rear access to the equipment rack 130 and few or no tools.

FIGS. 2A and 2B show rear and front views, respectively, of an illustrative base module 110', according to various embodiments. The illustrative base module 110' may be an implementation of base module 110 of FIG. 1. As shown, the base module 110' includes a housing 203 (e.g., a chassis) configured with rack mounts 205 for mounting to an equipment rack (e.g., as shown in FIG. 1). A rear face 207 and a front face 209 are also shown as part of the housing 203. As discussed above, embodiments such as the one illustrated as base module 110', are designed to facilitate customer serviceability. Accordingly, most of the replaceable components are shown as accessible from the front and rear exterior of the base module 110', which would be substantially exposed when mounted in a standard equipment rack.

Looking at the rear view of the base module 110' in FIG. 2A, access is provided to a robot CRU 210, one or more drive CRUs 220, and one or more power supply CRUs 230. As will be described more fully below, the robot CRU 210 is configured to house the robotic mechanism and supporting components (e.g., mechanical drive modules, control hardware and software modules, configuration memory, etc.). Traditional storage library systems typically are configured so that the robotic mechanisms are only serviceable by highly trained personnel, and even removing the mechanism to send out for off-site servicing requires training, specialized tools, or the like. The ability to replace the entire robotic mechanism and all its supporting components in a single CRU is a novel improvement over traditional implementations. For example, implementations allow a customer to simply pop out a broken robot CRU 210 using a couple of thumb screws, slide in a replacement CRU, and reinitialize the system, without waiting for a technician to troubleshoot and fix any issues.

Embodiments of the drive CRUs 220 are media drive modules that can be removed by an end consumer. Various implementations support standard, half-height or full-height tape drives. As described more fully below, the port in the drive for receiving a media cartridge faces into the base module 110', so that media cartridges can only be inserted and/or removed by the robotic mechanism within the confines of the housing 203. In some implementations, one or more "external" media drives may be provided to facilitate troubleshooting and the like.

Embodiments of the power supply CRUs 230 include any useful type of power supply components for supplying power to the base module 110' and or to any other components (e.g., to one or more expansion modules 120 (not shown)). For example, the power supply CRUs 230 can include power generators, power converters, power conditioners, back-up batteries and/or other power duplication, switches, input and/ or output ports, indicators, and the like. In some implementations, each power supply CRU 230 includes a male, three-prong connector for interfacing with line power and a main power switch. Some embodiments include a power supply CRU 230 for each drive CRU 220 (i.e., if the base module 110' has only a single drive CRU 220, it may also only have a single power supply CRU 230 to support the drive). In other embodiments, a second power supply CRU 230 is used as a backup supply to the first power supply CRU 230, and may be coupled with a different power source.

In one implementation, the base module 110' has slots for two power supplies (e.g., two power supply CRUs 230). These can be implemented as custom power supplies, for example, having an input voltage of 100-250 volts AC at 50-60 Hertz, and an output voltage of twelve volts DC switched plus five volts DC standby power. For example, the power supplies may be sized to run two tape drives plus robotics and any other sensors, etc. (e.g., with or without redundancy). Typically, the base module 110' has at least one power supply, even if no drives are included, to support the main processor, interface functionality (e.g., the display 150), etc.

Looking at the front view of the base module 110' in FIG. 2B, access is provided to a display 150, one or more magazines 140, and a mailslot 145. One or more indicators 255 may also be provided to show certain operational states, and the like (note that the sizes, numbers, positions, etc. of the indicators shown are intended only to be illustrative). In various implementations, base module 110 has overall library status indicators on the front and back of the module, along with a locate switch which activates the front and back locate LEDs; powered CRUs may have their own status indicators; hot-swappable CRUs can have indicators that show when the CRUs can be safely removed; power supplies and tape drives can have additional indicators; an "AC present" indicator can be provided to stay on even when the storage library is off (as long as AC power is connected). In one embodiment, a set of primary indicators include "locate," "fault," and "OK" indications. Next to the primary indicators are secondary indicators specific for the operator panel that indicate the status of the operator panel (e.g., an operator panel CRU, if implemented as such).

Other types of indications and status can also be provided using the display 150. Embodiments of the display 150 are used to facilitate various functionality through a local graphical user interface (GUI), including, for example, IO functions, service and diagnostic functions, etc. In one implementation, the display 150 is a seven-inch, front-mounted, touchscreen panel (e.g., an LCD touch panel display with a WVGA (wide VGA) 800×480 pixel screen equipped with a resistive or capacitive touch-sensitive overlay).

Each magazine 140 can be configured to hold multiple (e.g., up to fifteen) cartridges in such a way as to be reliably accessed by the robotic mechanism. For example, the magazines 140 can be designed to have features to aid in targeting, location, and or other functions of the robotic mechanism; features that securely hold the cartridges in place, while allowing for easy release of the cartridges to a robotic gripper when desired; features to add strength to the magazines 140 (e.g., to reduce sag, increase usable life, etc.) and/or to reduce weight; etc.

Embodiments of the mailslot 145 (or "Cartridge Access Port" (CAP)) include a special type of magazine designed to act as a controlled interface between the human user and the robotic mechanism. To add or remove cartridges from the storage library, a user ejects the mailslot 145 from the base module 110' and is presented with a number of cartridge slots (e.g., four "Import/Export cells" ("FE cells")). The user can then insert cartridges into, or remove cartridges from, these slots without interfering with robotic mechanism's operations. In some implementations, the robotic mechanism is used to activate a latch internal to the base module 110, thereby allowing the user to remove the mailslot 145 only when the robotic mechanism is in an appropriate condition (e.g., parked in the robot CRU 210). Certain embodiments having data partitions (as discussed above) only allow one partition at a time to make use of the mailslot 145.

FIGS. 3A and 3B show rear and front views, respectively, of an illustrative expansion module 120', according to various embodiments. The illustrative expansion module 120' may be an implementation of expansion module 120 of FIG. 1. As shown, the expansion module 120' includes a housing 303 (e.g., a chassis) configured with rack mounts 305 for mounting to an equipment rack (e.g., as shown in FIG. 1). A rear face 307 and a front face 309 are also shown as part of the housing 303. As with the base module 110' of FIGS. 2A and 2B, the expansion module 120' is designed to facilitate customer serviceability. Most of the replaceable components are shown as accessible from the front and rear exterior of the expansion module 120', which would be substantially exposed when mounted in a standard equipment rack.

In the embodiment shown, various aspects of the expansion module 120' are similar or identical to the base module 110'. For example, embodiments of the expansion module 120' do not typically have a robot CRU 210, display 150, or mailslot 145, as they are configured to exploit that functionality from the base module 110' components. However, like the base module 110', the expansion module 120' includes one or more drive CRUs 220 and one or more power supply CRUs 230 configured to be accessed from the rear side of the expansion module 120', and one or more magazines 140 configured to be accessed from the front side of the expansion module 120'. In some embodiments, the drive CRUs 220, power supply CRUs 230, and/or magazines 140 of the expansion module 120' are the same as those implemented in the base module 110'.

Because of the lack of certain features in embodiments of the expansion module 120' (e.g., there may be no robot CRU 210, no main processor, etc.), expansion module 120' power requirements may be different from those of the base module 110. In certain implementations, the expansion modules 120' still have slots for two power supplies (e.g., two power supply CRUs 230), which can be implemented as the same power supplies used in the base module 110 (e.g., to avoid having to support or source multiple types of power supplies). However, the power supplies of the base module 110 may provide more power than is needed to run configurations of the expansion modules 120'. For example, a single power supply may be able to support an expansion module 120' even with two drives, and it is possible to implement an expansion module 120' with no drives and no power supplies. Alternatively, two power supplies may still be used, for example, to provide redundancy.

As discussed above, the base module 110' and expansion modules 120' include a number of components that can be designed for customer replaceability, including the robot CRU 210, drive CRUs 220, power supply CRUs 230, and magazines 140. It is worth noting that, even though these components may be accessible and replaceable by customers, embodiments may still be configured to prevent (or mitigate) undesirable interference with those components. As one example, those replaceable components typically are installed in a physically secure manner (e.g., using latches, thumbscrews, removable faceplates, and/or other techniques) to provide relatively easy access when needed, while mitigating inadvertent access (e.g., accidental removal of a magazine 140 during operation). As another example, certain embodiments may allow a drive CRU 220 to be removed during operation of the storage system, so long as the drive is not actively in use (e.g., by using a drive eject or park command, or other technique). As still another example, removal of the robot CRU 210 or magazines 145 may be prevented until certain operations have been completed (e.g., the robotic mechanism is parked within the base module 110', etc.).

Figure 4A:
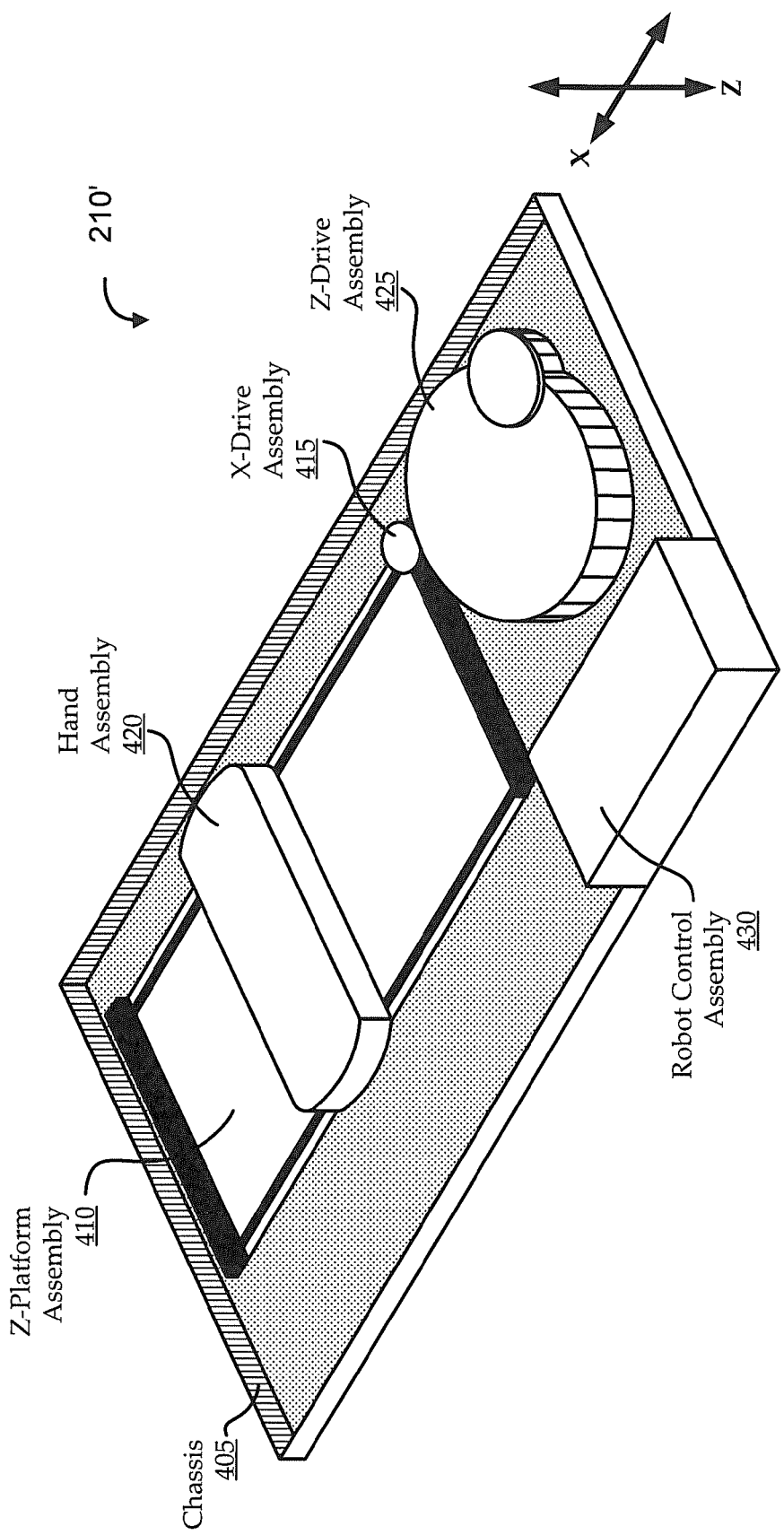
FIG. 4A shows a view looking down on the underside of an illustrative robot CRU (customer replaceable unit), according to various embodiments.
Figure 4B:
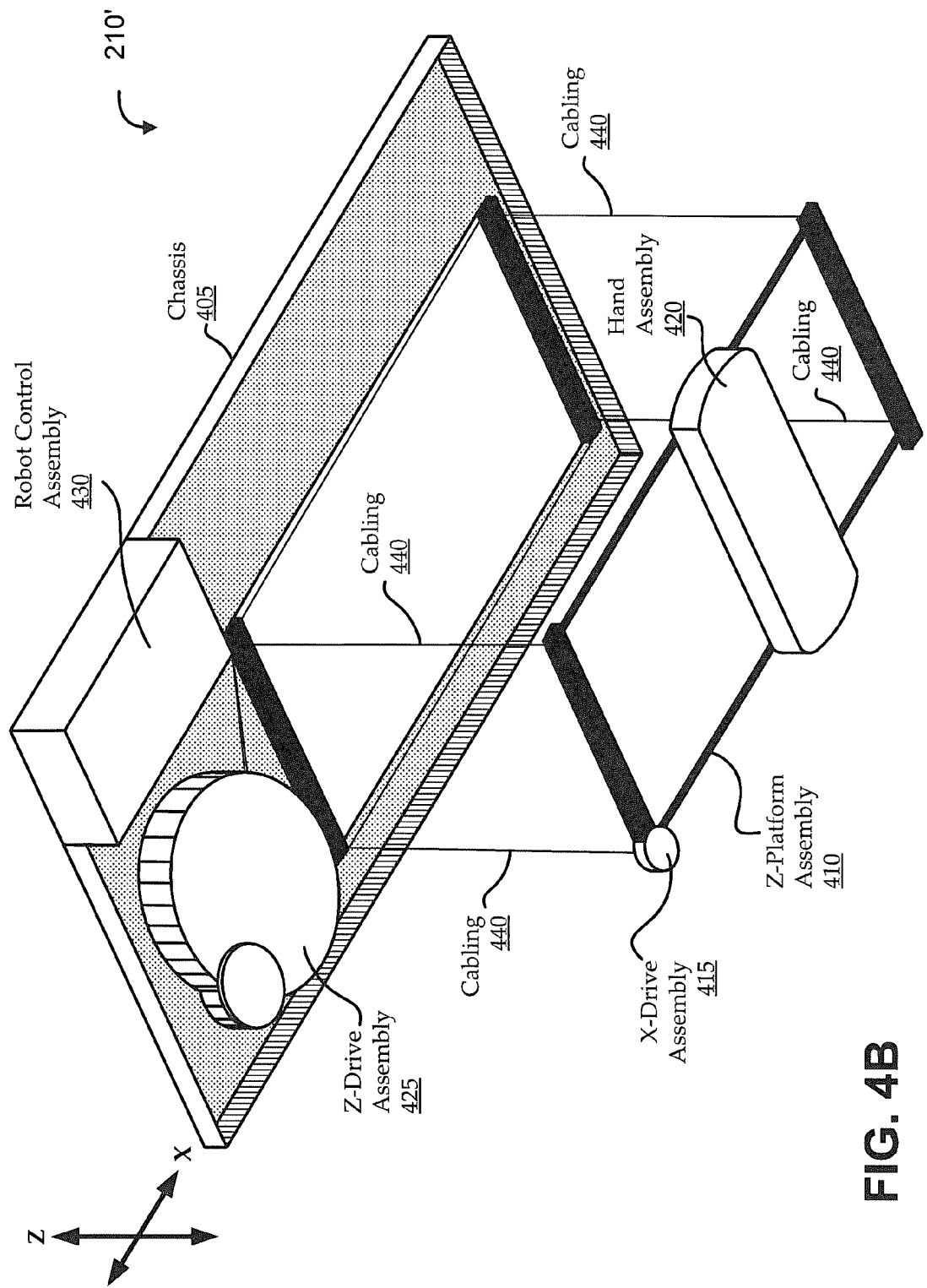
FIG. 4B shows another view looking up at the underside of an illustrative robot CRU with the Z-platform assembly partially lowered, according to various embodiments.

Much of the functionality of storage systems, like those discussed above with reference to FIGS. 1-3B, is facilitated by the robotic mechanism. As discussed above, the robotic mechanism is used to locate cartridges and ferry them between magazine slot locations and media drives. FIGS. 4A and 4B illustrate two views of an illustrative robot mechanism implemented as part of a robot CRU 210. The illustrations and descriptions of the robotic mechanism are highly simplified and represent only on possible type of implementation. Accordingly, they are intended only to add clarity and context and should not be construed as limiting the scope of the invention.

Turning to FIG. 4A, a view is shown looking down on the underside of an illustrative robot CRU 210', according to various embodiments. The robot CRU 210' may be an implementation of the robot CRU 210 of a base module 110, as discussed with reference to FIG. 2A. The robot CRU 210' includes a chassis 405 that houses a Z-platform assembly 410, an X-drive assembly 415, a hand assembly 420, a Z-drive assembly 425, and a robot control assembly 430.

In the implementation shown, the robotic mechanism is configured to move from its "home" position in the robot CRU 210' of the base module 110' down and/or over to any magazine 145 slot or drive in the base module 110' or an expansion module 120'. To accomplish this type of motion, the hand assembly 420 of the robotic mechanism moves in at least a "Z" direction (as used herein, the +Z direction is up towards the home position in the robot CRU 210, and the –Z direction is down towards the bottom-most magazine slots of the bottom-most expansion module 120') and an "X" direction (as used herein, the +X direction is towards the front side of the base module 110' or expansion modules 120', and the –X direction is towards the rear side of the base module 110' or expansion modules 120').

The hand assembly 420 is coupled with the Z-platform assembly 410, which can be moved in the Z-direction (i.e., raised and lowered) by the Z-drive assembly 425. The hand assembly 420 is also able to move along the Z-drive assembly 425 in the X-direction by the X-drive assembly 415 (e.g., along rails that are substantially perpendicular to the Z-directional axis). The Z-drive assembly 425 and X-drive assembly 415 may include any hardware for providing the desired movements, such as cables, gears, belts, rails, wheels, bearings, etc. Embodiments provide other types of motion in other ways. Some embodiments of the hand assembly 420 are coupled to the Z-platform assembly 410 via a "wrist" mechanism (not shown) that provides motion in a yaw direction (i.e., around the Z-directional axis). Some embodiments of the hand assembly 420 further provide radial movement from the Z-directional axis. For example, a grabber mechanism can "reach out" in a radial direction that is determined by the yaw (rotational) orientation provided by the wrist mechanism.

These various types of motion of the robotic mechanism, as well as other functionality of the robotic mechanism, are handled at least in part by the robot control assembly 430. Embodiments of the robot control assembly 430 are effectively the "brains" of the robotic mechanism, including electronic components used to store calibration information for the robotic mechanism, control movements of the robotic mechanism, read and/or decipher sensor information retrieved from the robotic mechanism, etc. For example, if data from a particular cartridge is desired, the robot control assembly 430 may direct the robotic mechanism to move to the magazine slot associated with that cartridge, verify presence of the cartridge, retrieve the cartridge from the magazine, ferry the cartridge to a drive, and release the cartridge into the drive.

For added clarity, FIG. 4B shows another view looking up at the underside of an illustrative robot CRU 210' with the Z-platform assembly 410 partially lowered, according to various embodiments. As illustrated, the Z-platform assembly 410 may not have a solid platform, and may instead be implemented as a carriage having a number of structural members (e.g., rails, supports, etc.). In the particular embodiment shown, the Z-drive assembly 425 includes motors and gearing that drive a bullwheel. The Z-platform assembly 410 is coupled with the bullwheel using a cable and pulley system. For example, cabling 440 is attached at each corner of the Z-platform assembly 410. The four cables 440 pass through pulleys and wrap around the bullwheel. Turning the bullwheel in one direction or the other adds slack to, or removes slack from, the cables 440, causing the Z-platform assembly 410 to be raised or lowered. Once in its desired Z-position (or while moving to that position), the X-drive assembly 415 can be used to move the hand assembly 420 (e.g., along rails of the Z-platform assembly 410) to a desired X-location. Once in its desired X-Z-position (or while moving to that position), the hand assembly 420 can be turned (e.g., using a wrist mechanism) to a desired rotational orientation (e.g., to face a cartridge slot or a media drive, to provide a desired angle for use of a sensor, etc.). If desired, a gripper mechanism may then be used to reach out (i.e., radially) from that X-Z-position and rotational orientation (e.g., to grab or release a cartridge).

The remainder of the description focuses on embodiments of the hand assembly 420, and particularly on novel embodiments of gripper mechanisms for use in a hand assembly 420. The systems described above are intended to provide context and clarity. However, it will be appreciated that embodiments of the inventive gripper mechanism described herein can be implemented in many other contexts, including in context of other embodiments of hand assemblies 420, other embodiments of storage systems, etc.

Figure 5:
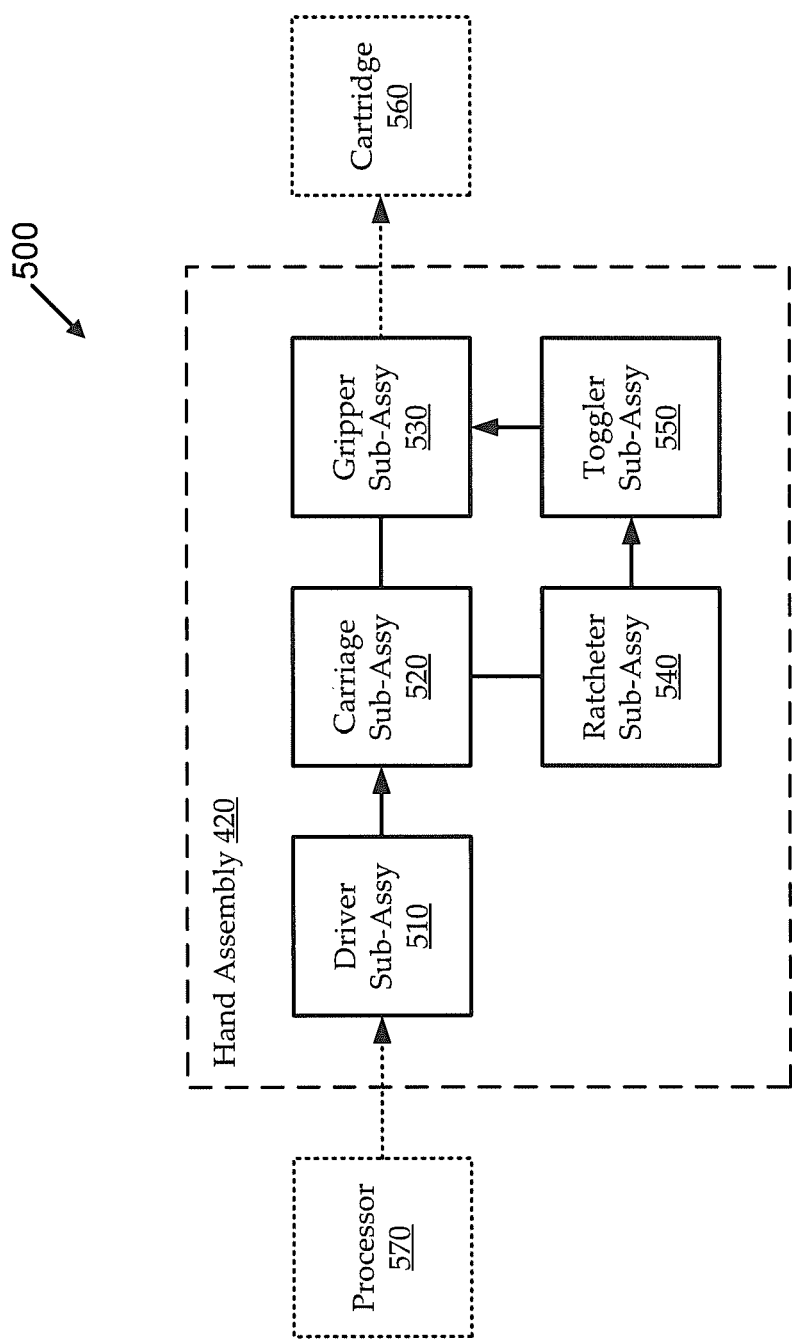
FIG. 5 shows a functional block diagram of an illustrative hand assembly, according to various embodiments.

FIG. 5 shows a functional block diagram 500 of an illustrative hand assembly 420, according to various embodiments. The hand assembly 420 is made up of a number of functional (e.g., mechanical and/or electrical) components, including a driver subassembly 510, a carriage subassembly 520, a gripper subassembly 530, a ratchet subassembly 540, and a toggler subassembly 550. Functions of the hand assembly 420 may be controlled and/or data to and from the hand assembly 420 may be handled by a processor 570. In some embodiments, the processor 570 is implemented as part of the robot control assembly 430 of the robot CRU 210, for example, as described with reference to FIGS. 4A and 4B. In other embodiments, the processing functionality of the processor 570 is implemented in one or more processors disposed in any useful location (e.g., integrated into the hand assembly 420) in communication with the hand assembly 420.

In one implementation, the storage library uses an Intel Atom processor as a main processor. The bulk of the library control software runs on the main processor. In addition, microchip PIC microcontrollers are used for machine control and sensor functions. The base module 110 contains the main processor and four PIC microcontrollers: two PIC microcontrollers used to operate motors and to monitor motion sensors; a third PIC microcontroller used to interface with tape drives, power supplies, magazine sensors; and a robotic mechanism "home" sensor; and a fourth PIC microcontroller used to interface with touch screen events and graphics display on the operator panel back to the library main processor. Each expansion module 120 can also contain one or more PIC microcontrollers. As in the base module 110, the PIC microcontroller in the expansion module 120 can interface with the tape drives, power supplies, magazine sensors, etc. Communications from the PIC microcontrollers of the expansion modules 120 may all be with the library main processor. Accordingly, there may be a number of distributed processors throughout the storage library and resources from one or more of those processors may be used to implement functionality of processor 570.

Embodiments of the driver subassembly 510 drive the mechanical movements of the hand assembly 420. For example, the driver subassembly 510 may include mechanisms for rotating the hand assembly 420 around an axis (e.g., the Z-axis, as discussed above) and/or mechanisms for moving the carriage subassembly 520 in a radial direction to the axis. Embodiments of the carriage subassembly 520 are configured to receive and hold a cartridge 560 while it is being ferried by the robotic mechanism around the storage library. For example, the carriage subassembly 520 may include a slot that is sized substantially to fit a cartridge 560 and one or more features for maintaining the cartridge 560 securely in the slot.

Embodiments of the gripper subassembly 530 are coupled with the carriage subassembly 520 in such a way that the gripper subassembly 530 is used to grip a cartridge 560 for holding in the carriage subassembly 520. In one implementation, the gripper subassembly 530 is substantially fixed at the end of the carriage subassembly 520, so that the entire carriage subassembly 520 is moved to reach out for a cartridge 560 (e.g., and the gripper subassembly 530 may be used to help hold the cartridge 560 in the carriage subassembly 520 during transport). In an alternative implementation, the gripper subassembly 530 is movably coupled with the carriage subassembly 520, so that it reaches out from the carriage subassembly 520 to draw a cartridge 560 into the carriage subassembly 520 for transport.

It will be appreciated that there are many ways to implement the gripper. Many traditional implementations of the gripper include complex, expensive, and/or heavy components. For example, some designs use solenoid-operated opposing gripper plates acting against a spring load. While these and other techniques can be reliable, they tend to manifest undesirable power consumption characteristics and to include heavy and/or expensive components (e.g., solenoids, power cables, specialized hardware and software, etc.). Embodiments described herein include novel gripper mechanisms that use light-weight components with low power consumption while still being highly reliable by exploiting functionality of the ratchet subassembly 540 and toggler subassembly 550.

As will be described more fully below, embodiments of the ratchet subassembly 540 are designed so that movement of the carriage subassembly 520 or the gripper subassembly 530 triggers a ratcheting mechanism. In some implementations, the ratcheting mechanism is triggered in only one direction of radial movement and is not triggered in the other direction. For example, the gripper subassembly 530 triggers the ratcheting mechanism as it reaches out (e.g., toward a cartridge), but the position of the ratcheting mechanism is substantially maintained as the gripper subassembly 530 retracts (e.g., moves away from a cartridge).

The ratchet subassembly 540 is coupled with the toggler subassembly 550 in such a way that the toggler subassembly 550 toggles between a first state and a second state whenever the ratchet subassembly 540 is triggered. In some implementations, the first state is an "open" state, and the second state is a "closed" state. In the open state, the gripper subassembly 530 is configured to not be gripping (e.g., to have its "fingers" open, to prepare to grab a cartridge 560, or to let go of a cartridge 560). In the closed state, the gripper subassembly 530 is configured to be gripping (e.g., to have its "fingers" closed, to be grabbing a cartridge 560, or to be holding a cartridge 560).

Thus, in some embodiments, the various functional blocks of the hand assembly 420 work together to cause the gripper subassembly 530 to toggle between open and closed states at appropriate times without complex electronics, software, etc. This functionality is further illustrated by FIGS. 6A-6D. FIGS. 6A-6D show four states of a simplified hand assembly 420, like the one described in FIG. 5, to illustrate novel functionality, according to various embodiments. In particular, the figures show an illustrative cycle of gripping and releasing a cartridge 560.

Looking first at FIG. 6A, the hand assembly 420 is positioned proximate to a cartridge 560. The gripper subassembly 530 is coupled with the carriage subassembly 520, both are in a retracted position, and the gripper subassembly 530 is in an open state. Moving to FIG. 6B, the driver subassembly 510 drives the carriage subassembly 520 outward toward the cartridge 560. As the carriage subassembly 520 moves into an extended position (i.e., in the direction of arrow 610b), it triggers the ratchet subassembly 540 (not shown), causing the toggler subassembly 550 (not shown) to toggle the state of the gripper subassembly 530 into a closed state. As illustrated, in the closed state, one or more gripper teeth 635 are positioned to interface with (e.g., grip) a cartridge feature 665. For example, the cartridge feature 665 may be a notch that is shaped and sized to fit with the gripper teeth 635. It will be appreciated that many other interfaces are possible between the gripper teeth 635 and the cartridge features 665. For example, the interface may provide gripping force in other locations (e.g., only on one side, on the front, back, top, or bottom of the cartridge 560, etc.), using other gripper teeth 635 shapes (e.g., pins, ridges, etc.), by friction fit techniques, by magnetic techniques, by vacuum techniques, etc. Notably, motion of the carriage subassembly 520 triggers the gripper subassembly 530 into the closed state, so that the hand assembly 420 is gripping the cartridge 560 by the time the carriage subassembly 520 completes its radial movement. In some embodiments, functionality is included to allow for variations in features, timing, etc., while maintaining reliability. For example, the gripper teeth 635 may be spring loaded. If the gripper subassembly 530 is toggled to the closed state too early or too late (e.g., not in the precise location of the cartridge feature 665), the gripper teeth 635 will maintain spring tension against the cartridge 560 until they reach the location of the cartridge feature 665 (e.g., and can snap into place).

Turning to FIG. 6C, the hand assembly 420 is now gripping the cartridge 560, and it is desired to pull the cartridge 560 back into the hand assembly 420 (e.g., out of its carriage slot or media drive) for transport. The driver subassembly 510 drives the carriage subassembly 520 back into its retracted position (i.e., in the direction of arrow 610c). According to the illustrative embodiment, movement in this direction does not trigger the ratchet subassembly 540 and does not cause the toggler subassembly 550 to toggle the state of the gripper subassembly 530. Accordingly, as the carriage subassembly 520 retracts, the gripper subassembly 530 remains in its closed position, thereby maintaining its hold on the cartridge 560.

Turning to FIG. 6D, it is now desired to release the cartridge 560 from the hand assembly 420 (e.g., into a carriage slot or media drive). Functionality of FIG. 6D substantially matches that of FIG. 6B, except that the gripper subassembly 530 is toggled from its closed state to its open state. In particular, the driver subassembly 510 drives the carriage subassembly 520 back into its extended position (i.e., in the direction of arrow 610d). Movement in this direction triggers the ratchet subassembly 540, causing the toggler subassembly 550 to toggle the state of the gripper subassembly 530 from closed to open. Accordingly, as the carriage subassembly 520 extends, the gripper subassembly 530 returns to its open state, thereby releasing its hold on the cartridge 560. Notably, motion of the carriage subassembly 520 triggers the gripper subassembly 530 into the open state, so that the hand assembly 420 is no longer gripping the cartridge 560 by the time the carriage subassembly 520 completes its radial movement.

Returning to FIG. 6A, it is desired to retract the carriage subassembly 520 without the cartridge 560, for example, to move the gripper subassembly 530 out of the magazine storage cell during empty movement of the hand assembly 420 within the storage library. The driver subassembly 510 drives the carriage subassembly 520 back into its retracted position (i.e., in the direction of arrow 610a). Again, movement in this direction does not trigger the ratchet subassembly 540 and does not cause the toggler subassembly 550 to toggle the state of the gripper subassembly 530. Accordingly, as the carriage subassembly 520 retracts, the gripper subassembly 530 remains in its open position, thereby remaining ready to grab another cartridge 560 when desired.

It will be appreciated that each full cycle of operation of the toggler subassembly 550 can be considered as involving two cycles of operation of the ratchet subassembly 540. For example, FIGS. 6B and 6C show one ratchet subassembly 540 cycle (i.e., involving an extend and a retract of the carriage subassembly 520), toggling the gripper subassembly 530 from open to closed; and FIGS. 6D and 6A show another ratchet subassembly 540 cycle (i.e., involving another extend and a retract of the carriage subassembly 520), toggling the gripper subassembly 530 from closed back to open. The full cycle starting at the state of FIG. 6A and returning to the state of FIG. 6A is one complete toggler subassembly 550 cycle, toggling the gripper subassembly 530 from open to closed and back to open. Notably, embodiments toggle the state of the gripper subassembly 530 by coupling the state to movement of the carriage subassembly 520, and not by relying a separate (e.g., decoupled) actuation mechanism.

Embodiments of the mechanical coupling between the carriage subassembly 520 motion and the state of the gripper subassembly 530 are shown in FIGS. 7A-9C. Each of these figures shows different views of a single implementation to add clarity to the description. It will be appreciated that the illustrated components are intended as non-limiting examples of components that can provide the novel functionality, and many modifications are possible within the scope of inventive embodiments.

Figure 7A:
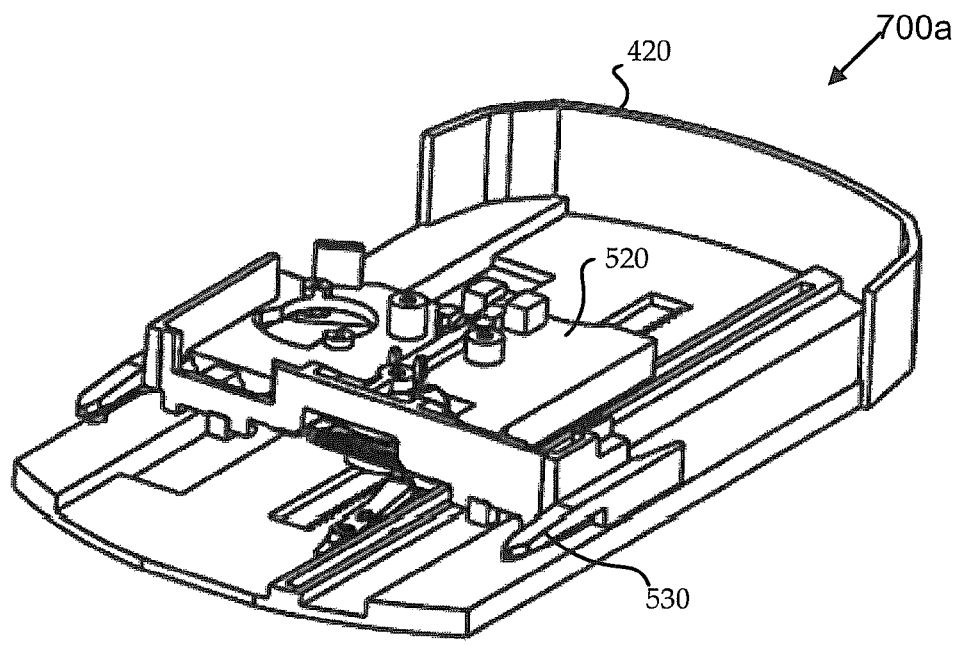
FIGS. 7A and 7B show retracted and extended isometric views, respectively, of an illustrative hand assembly, according to various embodiments.
Figure 7B:
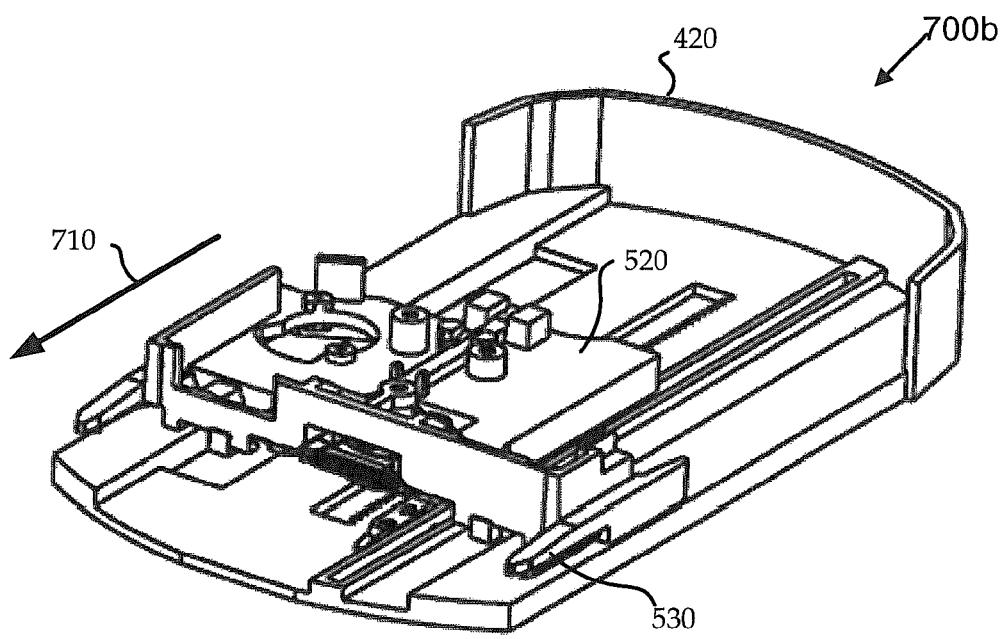

FIGS. 7A and 7B show retracted and extended isometric views 700, respectively, of an illustrative hand assembly 420, according to various embodiments. Each view 700 shows a hand assembly 420 with its carriage subassembly 520 and gripper subassembly 530. FIG. 7B shows the same hand assembly 420 as in FIG. 7A, after the carriage subassembly 520 has been moved to an extended position in the direction of arrow 710. The component subassemblies are coupled in such a way that movement of the carriage subassembly 520 also causes the gripper subassembly 530 to move to an extended position. In other embodiments, it is possible to extend the gripper subassembly 530 without a comparable movement from the carriage subassembly 520. For example, the carriage subassembly 520 may rotate substantially in place around an axis, and the gripper subassembly 530 may independently move in a radial direction to that axis.

Figure 8A:
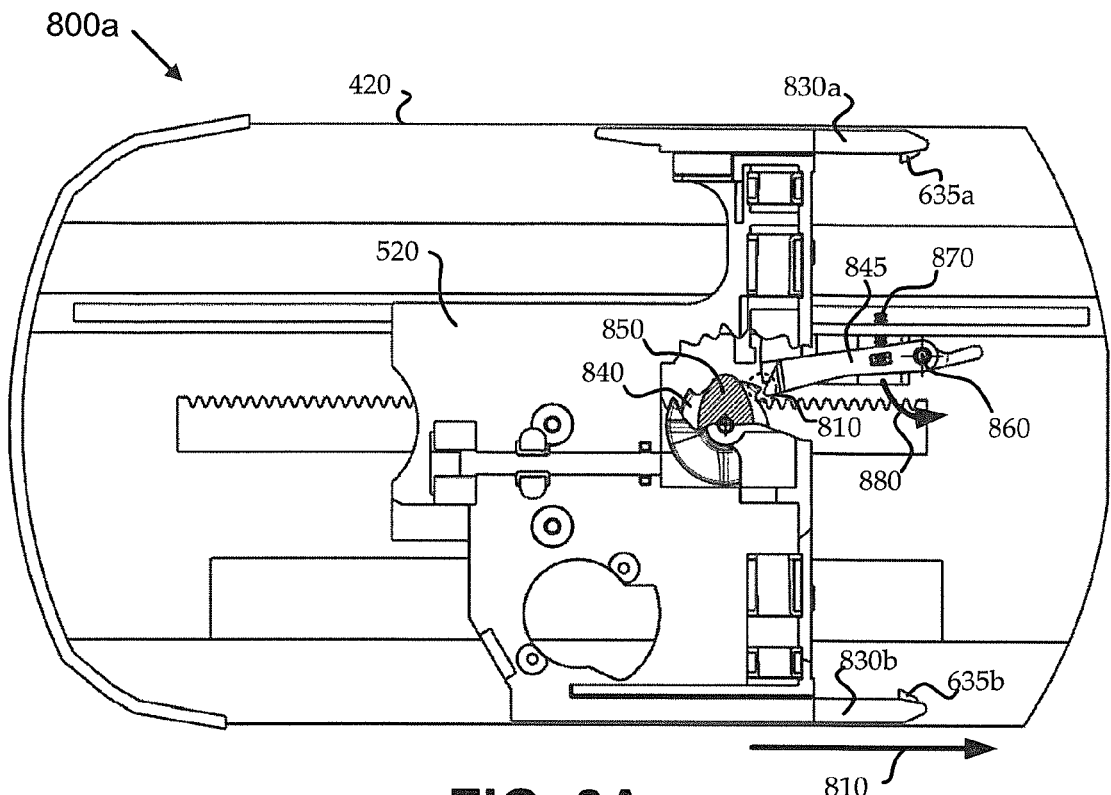
FIGS. 8A and 8B show retracted and extended top views, respectively, of an illustrative hand assembly, according to various embodiments.
Figure 8B:
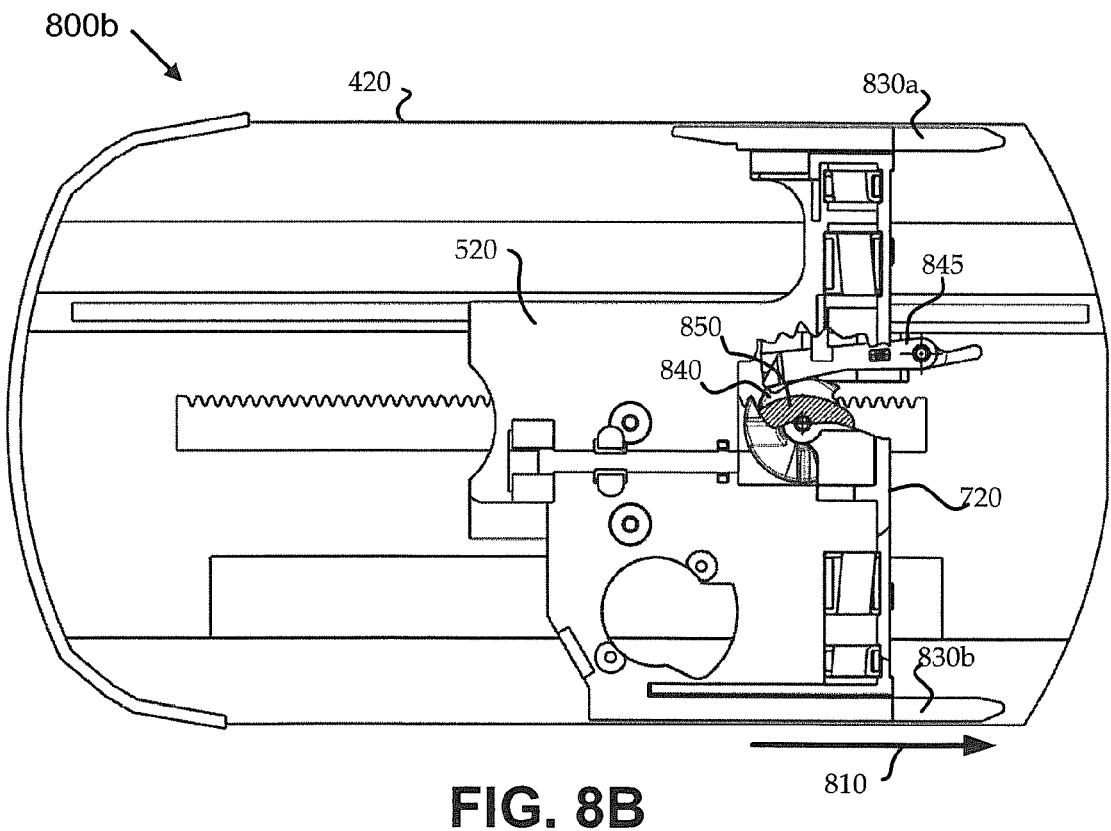

FIGS. 8A and 8B show retracted and extended top views 800, respectively, of an illustrative hand assembly 420, according to various embodiments. The top retracted view 800a of FIG. 8A substantially corresponds to the isometric retracted view 700a of FIG. 7A and to the state illustrated by FIG. 6C. The top extended view 800b of FIG. 8B substantially corresponds to the isometric extended view 700b of FIG. 7B and to the state illustrated by FIG. 6D. Accordingly, each view 800 shows a hand assembly 420 with a carriage subassembly 520 and a number of additional components that are part of that or other subassemblies. The views 800 further illustrate how certain components change as the carriage subassembly 520 moves from a retracted and closed position to an extended and open position.

As illustrated, the carriage subassembly 520 is coupled with fingers 830 of an illustrative gripper subassembly 530 (not shown). In the retracted and closed state of FIG. 8A, gripper teeth 635 are exposed (e.g., for interfacing with a cartridge feature 665, as described with reference to FIGS. 6A and 6B). A ratchet wheel 840 and ratchet pawl 845 are part of an illustrative ratchet subassembly 540 (not shown). The ratchet wheel 840 is coupled with a toggler 850, which is part of an illustrative toggler subassembly 550 (not shown). The ratchet wheel 840 and the toggler 850 are rotatably coupled with the carriage subassembly 520, so that radial movement of the carriage subassembly 520 causes radial movement of the ratchet wheel 840 and the toggler 850, while allowing the ratchet wheel 840 and the toggler 850 to rotate around their own axis. The ratchet pawl 845 is in a substantially fixed location (e.g., radial location) on the hand assembly 420, but it is loaded on a rotational axis 860 to be held with a spring 870 providing a rotational torque (e.g., in the direction of arrow 880) substantially in an interface position 810 at which the ratchet pawl 845 can interface with the ratchet wheel 840.

As the carriage subassembly 520 moves in the direction of arrow 810 (e.g., which may substantially be the direction of arrow 710 of FIG. 7B and arrow 610d of FIG. 6D), the ratchet wheel 840 also moves in the direction of arrow 810, while the ratchet pawl 845 does not. As such, continued movement in the direction of arrow 810 causes the ratchet pawl 845 to apply a rotational force to the ratchet wheel 840, causing the ratchet wheel 840 and the toggler 850 to turn about an axis of rotation (either a shared axis, as shown, or separate axes). As illustrated, movement of the carriage subassembly 520 from the retracted position of FIG. 8A to the extended position of FIG. 8B causes the toggler 850 to make a substantially ninety-degree turn. The oblong shape of the toggler 850 has a longer dimension and a shorter dimension (both perpendicular to the axis of rotation). Accordingly, the ninety-degree turn causes the longer dimension of the toggler 850 to toggle from being oriented in a direction substantially perpendicular to arrow 810 in FIG. 8A to being oriented in a direction substantially parallel to arrow 810 in FIG. 8B. As will be described more fully below, this causes the spring-loaded gripper teeth 635 to toggle from a closed to an open state (the gripper teeth 635 are no longer exposed in the extended and open state of FIG. 8B).

It is worth noting that the teeth of the ratchet wheel 840 are shaped to effectively provide a contact surface for the ratchet pawl 845 from one direction and no contact surface from the other direction. The direction, shape, and spring-loaded rotational coupling of the ratchet pawl 845 are also designed to facilitate catching of the ratchet pawl 845 on teeth of the ratchet wheel 840 in one direction, but not in the other direction. Accordingly, movement of the ratchet wheel 840 in the direction of arrow 810 with respect to the ratchet pawl 845 reliably causes the ratchet pawl 845 to turn the ratchet wheel 840. However, movement in the opposite direction, allows the ratchet wheel 840 to slip past the ratchet pawl 845 without any further appreciable turning. In this way, ratchet wheel 840 and the toggler 850 turn (i.e., the ratchet subassembly 540 triggers and the toggler subassembly 550 toggles) only with outward movement of the carriage subassembly 520.

Figure 9A:
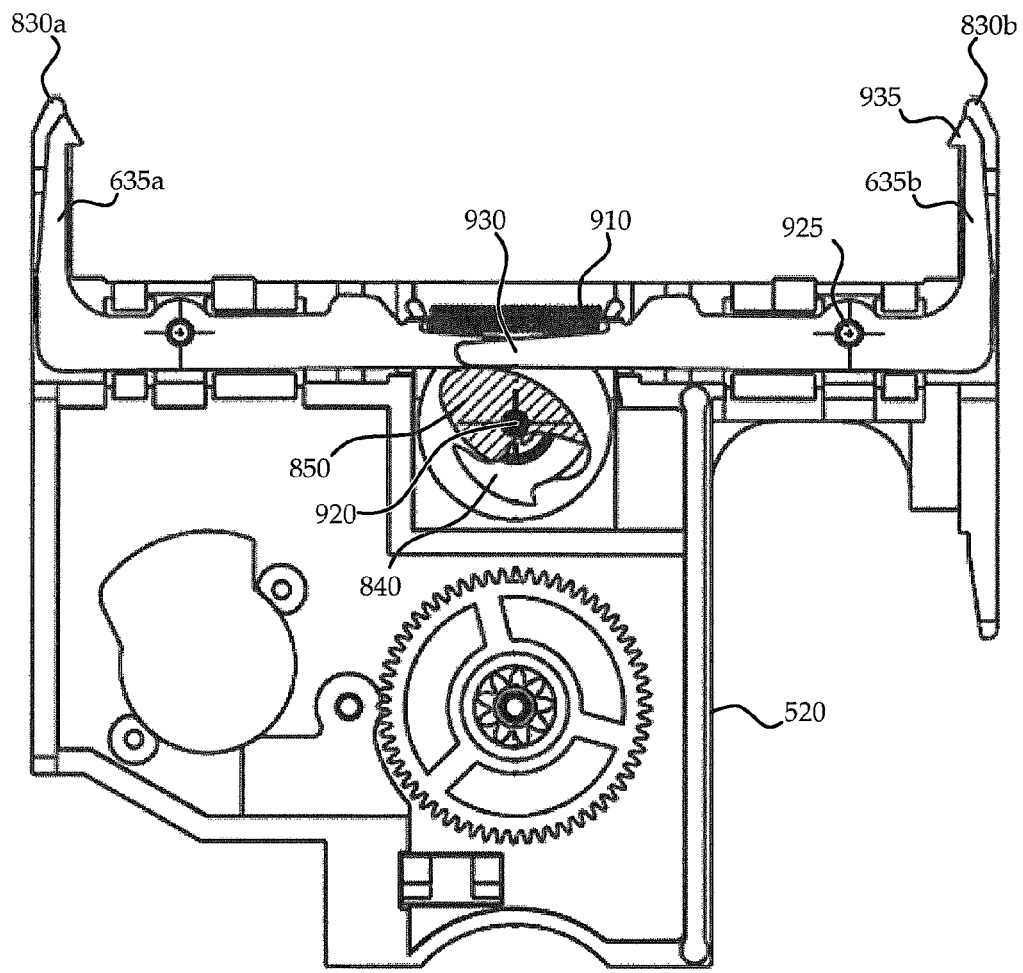
FIG. 9A shows a bottom view of a carriage subassembly coupled with components including those of a gripper subassembly in a closed state, according to various embodiments.
Figure 9B:
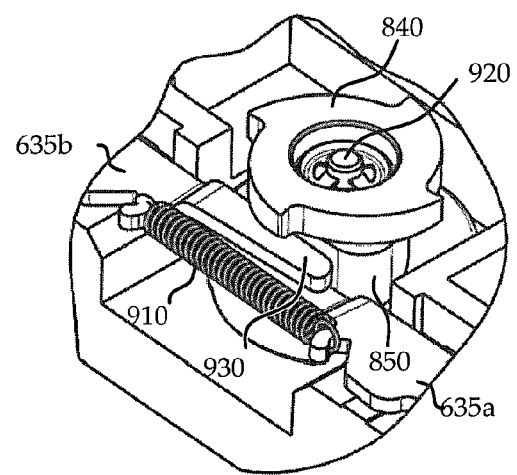
FIG. 9B shows a close-up view of features of FIG. 9A.
Figure 9C:
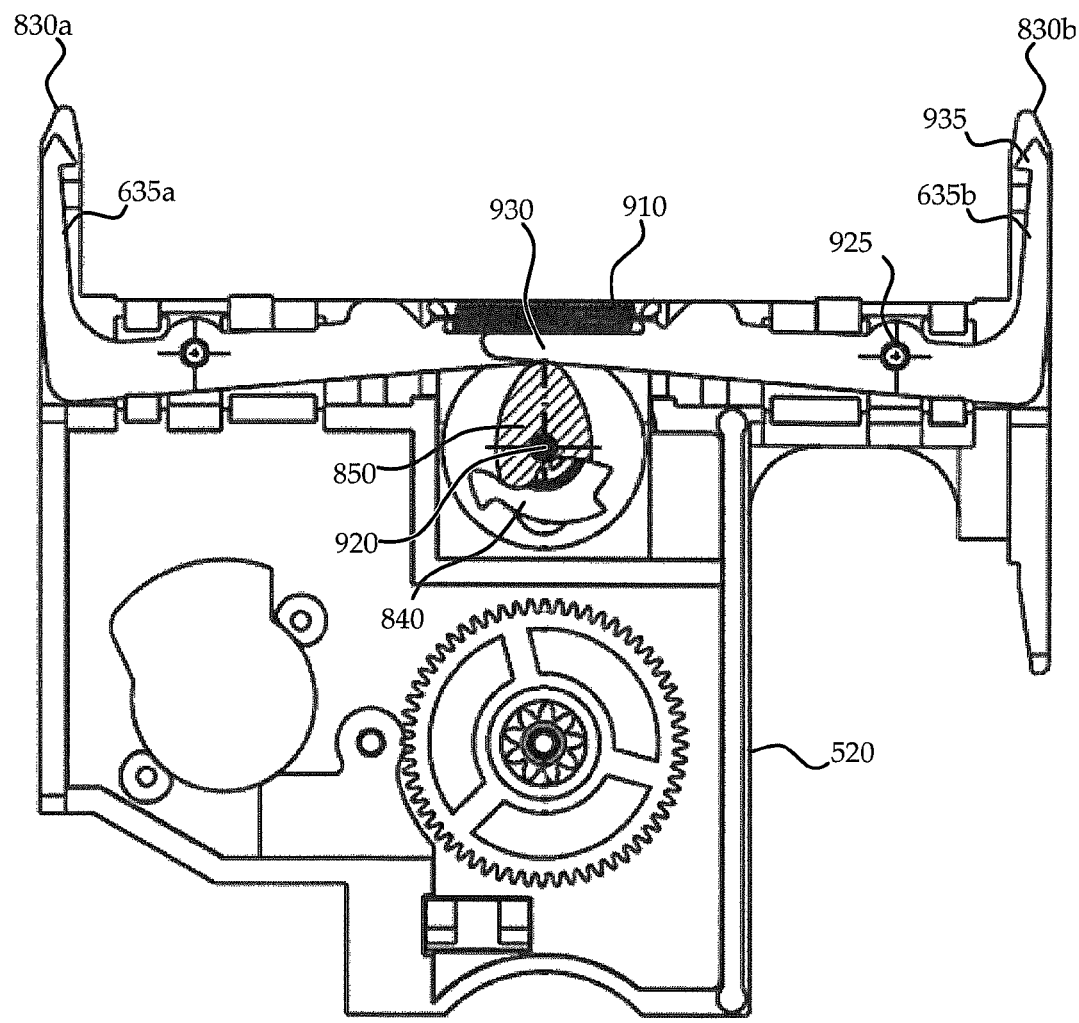
FIG. 9C shows another bottom view of the carriage subassembly of FIG. 9A, but with the gripper subassembly in an open state, according to various embodiments.

FIGS. 9A-9C provide additional views of components that facilitate the novel gripper mechanism functionality. FIG. 9A shows a bottom view of a carriage subassembly 520 coupled with components of a gripper subassembly in a closed state, a ratchet subassembly, and a toggler subassembly, according to various embodiments. The hand assembly 420 includes fingers 830, gripper teeth 635, a ratchet wheel 840 (only partially shown in cutaway), and a toggler 850. As illustrated, two gripper teeth 635 are implemented as substantially mirrored components, each having an axis of rotation 925.

In the illustrated embodiment, gripper teeth 635 are held in a normally closed position using tension of a spring 910. In alternative embodiments, spring tension is used, instead, to hold the gripper teeth 635 in a normally open position. In other alternative embodiments, spring tension is used to pull the gripper teeth 635 laterally (e.g., along a rail or track), rather than rotationally). Each of the gripper teeth 635 is shaped and rotationally coupled so that lateral movement of a gripper tooth 635 on a control location 930 to one side of its rotational coupling 925 causes movement of a tooth feature 935 on the other side of its rotational coupling 925. By orienting the gripper teeth 635 to be substantially mirrored with their respective control locations 930 proximate to one another, it is possible to cause the tooth features 935 of the gripper teeth 635 to move in opposition to each other by applying lateral force substantially simultaneously to both control locations 930. By further spring-loading the gripper teeth 635 as shown, force from the spring tension in one direction and counteracting force applied in the opposite direction can cause the tooth features 935 to effectively open and close.

Turning briefly to FIG. 9B, a close-up view is shown of features of FIG. 9A. As shown, the spring 910 provides tension to hold the gripper teeth 635 in a normally closed state. The control locations 930 of the gripper teeth 635 are directly proximate to the toggler 850. In some embodiments, the toggler 850 and the ratchet wheel 840 rotate around a common axis 920. As discussed above, movement of the carriage subassembly 520 (not shown) can be used to push the ratchet wheel 840 against a ratchet pawl 845 (not shown), causing the toggler 850 to make a quarter-turn.

Returning to FIG. 9A, each quarter turn of the toggler 850 about its axis 920 causes its oblong shape to be oriented in substantially one of two positions (i.e., for the sake of simplicity, it is assumed that the toggler 850 is symmetric about both its oblong dimensions, so that two quarter-rotations from a first position effectively returns the toggler 850 to that first position). In one such position, the longer dimension of the toggler 850 is oriented away from the control locations 930 of the gripper teeth 635. This is the position illustrated in FIG. 9A. With the toggler 850 in this position, it does not push against the control locations 930 of the gripper teeth 635, and the gripper teeth 635 can remain held by the spring 910 in their normally closed state.

Turning to FIG. 9C, another bottom view is shown of the carriage subassembly 520 of FIG. 9A, but with the gripper subassembly in an open state, according to various embodiments. FIG. 9C illustrates the other position of the toggler 850, in which the longer dimension is oriented toward the control locations 930 of the gripper teeth 635. With the toggler 850 in this position, it effectively provided a force against the control locations 930 of the gripper teeth 635 in opposition to the spring 910 force, causing the gripper teeth 635 to be pushed into an open state.

Looking at FIGS. 9A-9C together, certain ratcheting gripper mechanism functionality can be appreciated. As shown, the ratchet wheel 840 is designed with four teeth, equally spaced around its circumference. Each time the ratchet pawl 845 pushes past the ratchet wheel 840, it turns the ratchet wheel 840 approximately one-quarter of a rotation (e.g., approximately ninety degrees). The quarter-rotation of the ratchet wheel 840 causes a quarter-rotation of the toggler 850, which effectively toggles the orientation of the toggler 850 between two states (e.g., one in which the longer dimension faces toward the control locations 930 of the gripper teeth 635, and another in which the longer dimension faces away from the control locations 930 of the gripper teeth 635). Each time the orientation of the toggler 850 changes, the state of the gripper teeth 635 toggles between an open and a closed state. Accordingly, each time the ratchet pawl 845 pushes past and turns the ratchet wheel 840, the state of the gripper teeth 635 is toggled. As discussed above with reference to FIGS. 8A and 8B, the ratchet pawl 845 pushes past and turns the ratchet wheel 840 when the gripper subassembly 530 is extended, but not when it is retracted. In this way, the state of the gripper teeth 635 toggles each time the gripper subassembly 530 is extended, and the state of the gripper teeth 635 is maintained each time the gripper subassembly 530 is retracted.

It will be appreciated that many modifications are possible without departing from the scope of the embodiments. One such modification may involve implementing a coupling as a set of couplings (e.g., a set of gears, bearings, etc. can be used to implement a single coupling). For example, while the toggler 850 and the ratchet wheel 840 are illustrated as being fixed to each other and rotating around a common axis, they may alternatively be coupled through one or more mechanical and/or electrical coupling. In one implementation, the ratchet subassembly 540 is implemented as a sensor (e.g., proximity, optical, electrical, magnetic, etc.) that detects when the carriage subassembly 520 moves in a certain direction and/or past a certain location and sends a signal to toggle the toggler 850 (e.g., as a digital flag, as a control signal for a motor, as a release of a latch or relay, etc.). Some other such modifications can include alternative shapes, sizes, and/or orientations used for components of the ratchet subassembly 540 and/or the toggler subassembly 550. It will be further appreciated that the various subassemblies can have additional components for providing additional functionality. For example, the hand assembly 420 can include one or more sensors for detecting the toggler 850 state (e.g., orientation) or gripper mechanism state (e.g., open or closed), the carriage subassembly 520 position (e.g., at "home," extended, retracted, etc.), whether the carriage subassembly 520 is empty, the wrist position (e.g., angle of rotation of the hand assembly 420), whether a cartridge is "safe," etc.

Figure 10:
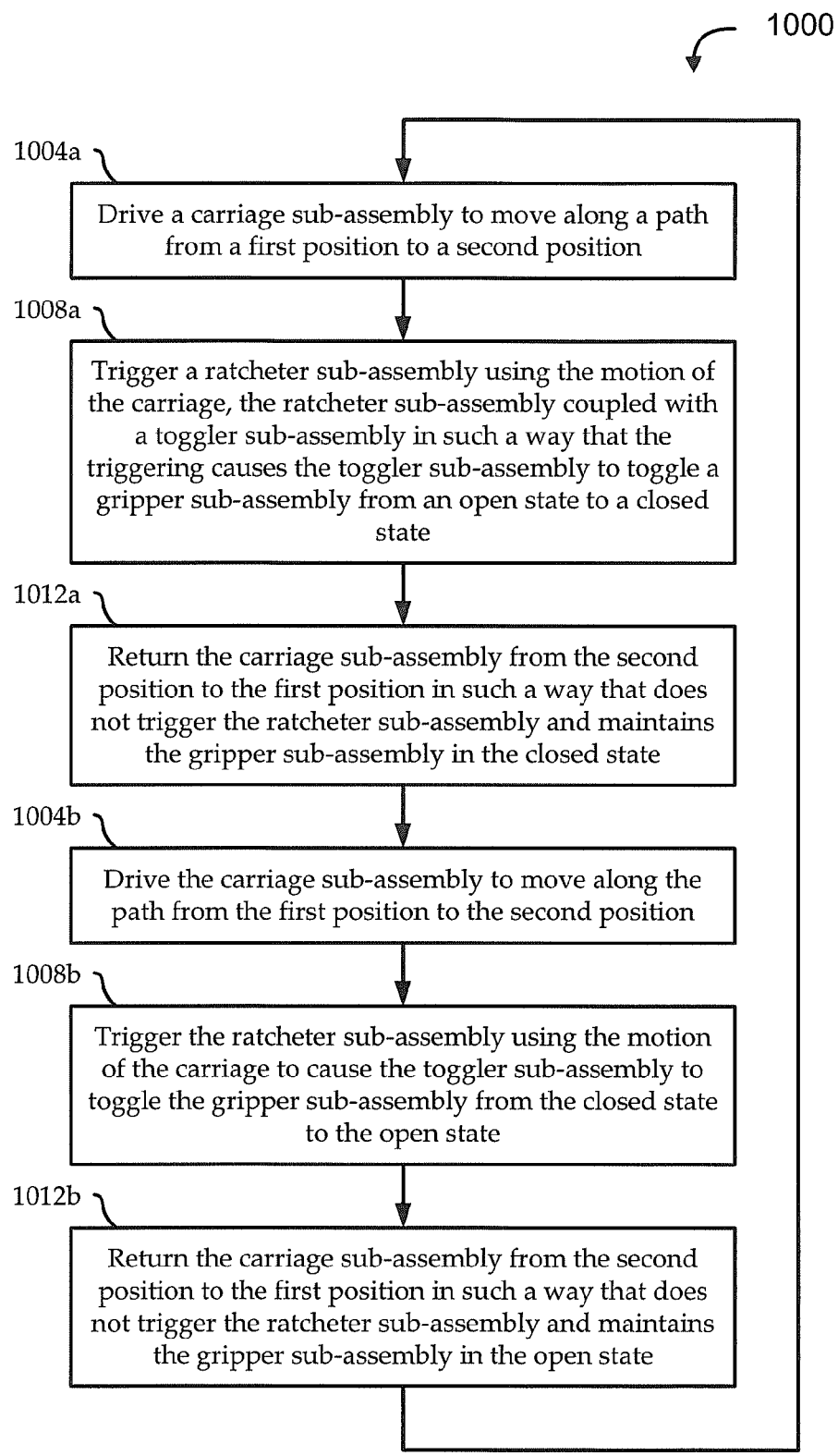
FIG. 10 shows a flow diagram of an illustrative method for implementing ratcheting gripper functionality, according to various embodiments.

FIG. 10 shows a flow diagram of an illustrative method 1000 for implementing ratcheting gripper functionality, according to various embodiments. It is noted that embodiments of the method can be performed using system components other than those discussed above, and the system components described above can be used to perform many functions other than those described with reference to the method embodiments. Accordingly, any references to specific system components in the method descriptions are used to provide added clarity, but are not intended to limit the scope of method embodiments.

Embodiments begin at stage 1004a by driving a carriage subassembly to move along a path from a first position to a second position. For example, referring to FIG. 5, a driver subassembly 510 drives a carriage subassembly 520 from a retracted position to an extended position. At stage 1008a, a ratcheter subassembly is triggered using the motion of the carriage. The ratcheter subassembly is coupled with a toggler subassembly in such a way that the triggering causes the toggler subassembly to toggle a gripper subassembly from an open state to a closed state. For example, motion of the carriage subassembly 520 triggers the ratcheter subassembly 540 to ratchet to a next position, toggling the state of the toggler subassembly 550, thereby toggling the state of a gripper subassembly 530 and exposing the gripper teeth 635 (e.g., as illustrated by the transition from FIG. 6A to FIG. 6B). At stage 1012a, the carriage subassembly is returned from the second position to the first position in such a way that does not trigger the ratcheter subassembly and maintains the gripper subassembly in the closed state. For example, the ratcheter subassembly 540 can be configured to trigger only in one direction by using a ratcheting pin 845 or other technique (e.g., as discussed with reference to FIGS. 8A and 8B, and as illustrated by the transition from FIG. 6B to FIG. 6C).

Embodiments continue at stage 1004b by driving the carriage subassembly again to move along the path from the first position to the second position. At stage 1008b, the ratcheter subassembly is again triggered using the motion of the carriage, this time causing the toggler subassembly to toggle the gripper subassembly from the closed state to the open state. For example, the driver subassembly 510 again drives the carriage subassembly 520 from the retracted position to the extended position, causing the ratcheter subassembly 540 to ratchet to a next position, toggling the state of the toggler subassembly 550, and toggling the state of a gripper subassembly 530 to open the gripper teeth 635 (e.g., as illustrated by the transition from FIG. 6C to FIG. 6D). At stage 1012b, the carriage subassembly is returned again from the second position to the first position in such a way that does not trigger the ratcheter subassembly and maintains the gripper subassembly in the open state (e.g., as illustrated by the transition from FIG. 6D to FIG. 6A). As indicated, the method 1000 may continue to cycle through the stages, toggling the state of the gripper subassembly between open and closed states.

It is worth noting that, while embodiments are described herein primarily as providing a two-state mechanism, similar techniques can be applied to mechanisms having more than two states. For example, a ratchet wheel 840 similar to the one illustrated in FIG. 9B could be implemented with a different shape and/or a different number of teeth, the toggler 850 could be implemented in a different shape (e.g., asymmetrically, etc.), additional linkages and/or mechanisms could be provided, or the like. Those types of modifications can create a ratcheting mechanism that has more than two states for use in various contexts, including in contexts outside that of a cartridge gripper mechanism.

The methods disclosed herein comprise one or more actions for achieving the described method. The method and/or actions may be interchanged with one another without departing from the scope of the claims. In other words, unless a specific order of actions is specified, the order and/or use of specific actions may be modified without departing from the scope of the claims.

The various operations of methods and functions of certain system components described above may be performed by any suitable means capable of performing the corresponding functions. The means may include various hardware and/or software component(s) and/or module(s), including, but not limited to a circuit, an application specific integrated circuit (ASIC), or processor. For example, logical blocks, modules, and circuits described may be implemented or performed with a general purpose processor, a digital signal processor (DSP), an ASIC, a field programmable gate array signal (FPGA), or other programmable logic device (PLD), discrete gate, or transistor logic, discrete hardware components, or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm or other functionality described in connection with the present disclosure, may be embodied directly in hardware, in a software module executed by a processor, or in a combination of the two. A software module may reside in any form of tangible storage medium. Some examples of storage media that may be used include random access memory (RAM), read only memory (ROM), flash memory, EPROM memory, EEPROM memory, registers, a hard disk, a removable disk, a CD-ROM and so forth. A storage medium may be coupled to a processor such that the processor can read information from, and write information to, the storage medium. In the alternative, the storage medium may be integral to the processor. A software module may be a single instruction, or many instructions, and may be distributed over several different code segments, among different programs, and across multiple storage media. Thus, a computer program product may perform operations presented herein. For example, such a computer program product may be a computer readable tangible medium having instructions tangibly stored (and/or encoded) thereon, the instructions being executable by one or more processors to perform the operations described herein. The computer program product may include packaging material. Software or instructions may also be transmitted over a transmission medium. For example, software may be transmitted from a website, server, or other remote source using a transmission medium such as a coaxial cable, fiber optic cable, twisted pair, digital subscriber line (DSL), or wireless technology such as infrared, radio, or microwave.

Other examples and implementations are within the scope and spirit of the disclosure and appended claims. For example, features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein may be utilized. Accordingly, the appended claims include within their scope such processes, machines, manufacture, compositions of matter, means, methods, or actions.

What is claimed is:

1. A hand assembly for physically handling media in a data storage library, the hand assembly comprising:
   a carriage subassembly configured to move along a path between a first position and a second position and in mechanical communication with a gripper subassembly that is configured to be in an open state or a closed state;
   a ratchet subassembly configured to be triggered by motion of the carriage subassembly from the first position to the second position and not to be triggered by motion of the carriage subassembly from the second position to the first position; and
   a toggler subassembly in mechanical communication with the ratchet subassembly and the gripper subassembly in such a way that triggering the ratchet subassembly causes the toggler subassembly to toggle the gripper subassembly between the open state and the closed state.

2. The hand assembly of claim 1, wherein the ratchet subassembly comprises:
   a ratchet pawl and a ratchet trigger configured to move relative to each other in conjunction with movement of the carriage assembly, so that movement of the carriage subassembly along the path from the first position to the second position causes the ratchet pawl to contact and trigger the ratchet trigger and movement of the carriage subassembly along the path from the second position to the first position does not cause the ratchet pawl to contact and trigger the ratchet trigger.

3. The hand assembly of claim 1, wherein the ratchet subassembly comprises:
   a ratchet pawl disposed within a substantially fixed position with respect to motion of the carriage assembly; and
   a ratchet wheel coupled with the carriage assembly in such a way as to move relative to the ratchet pawl in conjunction with movement of the carriage assembly, so that movement of the carriage subassembly along the path from the first position to the second position causes the ratchet pawl to contact and turn the ratchet wheel thereby causing the toggler subassembly to toggle the gripper subassembly between the open state and the closed state, and movement of the carriage subassembly along the path from the second position to the first position does not cause the ratchet pawl to turn the ratchet wheel thereby maintaining the gripper subassembly in the open state or the closed state.

4. The hand assembly of claim 1, wherein:
   the gripper subassembly comprises at least one gripper tooth having a gripping feature region and a control region and configured so that application of force at the control region causes the gripping feature region to move from a first state to a second state; and
   the toggler subassembly comprises a contact feature configured to apply the force at the control region when in a first toggle state and to not apply the force at the control region when in a second toggle state, the toggler configured to toggle between the first toggle state and the second toggle state in response to triggering the ratchet subassembly.

5. The hand assembly of claim 4, wherein:
   the gripper subassembly further comprises a tension means for holding the gripping feature region of the at least one gripper tooth normally in the first state, so that application of the force at the control region causes the gripping feature region to move from the first state to the second state by counteracting the tension means and a lack of application of the force at the control region causes the gripping feature region to return from the second state to the first state under tension from the tension means.

6. The hand assembly of claim 4, wherein:
   the toggler subassembly comprises an oblong wheel having a long axis and a short axis, both perpendicular to an axis of rotation, the oblong wheel configured to turn a partial rotation about the axis of rotation in response to each triggering of the ratchet subassembly, so that, with each triggering of the ratchet subassembly, the long axis toggles from pointing substantially toward the control region and pointing away from the control region, the oblong wheel being disposed adjacent to the control region so as to apply the force to the control region when the long axis is pointing substantially toward the control region.

7. The hand assembly of claim 1, wherein the gripper subassembly comprises two gripper teeth configured to interface with a notch in a casing of a storage media cartridge so as to selectively grip the cartridge when the gripper subassembly is in the closed position and release the cartridge when the gripper subassembly is in the open position.

8. The hand assembly of claim 1, wherein the gripper subassembly comprises at least one gripping feature configured to interface with a cartridge feature of a storage media cartridge.

9. The hand assembly of claim 1, wherein the first position is a retracted position and the second position is an extended position.

10. The hand assembly of claim 9, wherein:
when the gripper subassembly is in the open state and the carriage subassembly is in the retracted position, movement of the carriage subassembly along the path to the extended position triggers the gripper subassembly to toggle to the closed state;
when the gripper subassembly is in the open state and the carriage subassembly is in the extended position, movement of the carriage subassembly along the path to the retracted position maintains the gripper subassembly in the open state;
when the gripper subassembly is in the closed state and the carriage subassembly is in the retracted position, movement of the carriage subassembly along the path to the extended position triggers the gripper subassembly to toggle to the open state; and
when the gripper subassembly is in the closed state and the carriage subassembly is in the extended position, movement of the carriage subassembly along the path to the retracted position maintains the gripper subassembly in the closed state.

11. A hand assembly for physically handling media in a data storage library, the hand assembly comprising:
driving means for moving a gripping means along a path between a first position and a second position; and
toggling means for toggling the gripping means between an open state and a closed state in response to triggering by a triggering means, the triggering means being triggered by motion of the gripping means from the first position to the second position and not by motion of the gripping means from the second position to the first position.

12. The hand assembly of claim 11, wherein the triggering means comprises a ratchet subassembly.

13. The hand assembly of claim 11, wherein:
the gripping means comprises means for moving from a first gripping state to a second gripping state in response to receiving a control force; and
the toggling means comprises means for applying the control force to the gripping means when in a first toggle state and not applying the control force to the gripping means when in a second toggle state, the toggling means configured to toggle between the first toggle state and the second toggle state in response to triggering by the triggering means.

14. The hand assembly of claim 13, wherein:
the gripping means further comprises means for holding the gripping means in the first gripping state when not receiving the control force.

* * * * *

UNITED STATES PATENT AND TRADEMARK OFFICE
CERTIFICATE OF CORRECTION

PATENT NO.       : 8,665,554 B2
APPLICATION NO.  : 13/348486
DATED            : March 4, 2014
INVENTOR(S)      : Manes et al.

It is certified that error appears in the above-identified patent and that said Letters Patent is hereby corrected as shown below:

In the Specification

In column 5, line 31, delete "and or" and insert -- and/or --, therefor.

In column 6, line 24, delete "and or" and insert -- and/or --, therefor.

In column 6, line 36, delete "("FE" and insert -- ("I/E --, therefor.

Signed and Sealed this
Fifteenth Day of July, 2014

Michelle K. Lee
*Deputy Director of the United States Patent and Trademark Office*